United States Patent [19]
Fraioli, Sr.

[11] 3,938,926
[45] Feb. 17, 1976

[54] PIZZA PIE FORMING MACHINE

[76] Inventor: Joseph Fraioli, Sr., 300 Martine Ave., White Plains, N.Y. 10601

[22] Filed: Oct. 16, 1974

[21] Appl. No.: 515,082

[52] U.S. Cl. ............................... 425/233; 425/395
[51] Int. Cl.² ............................................. A21C 11/00
[58] Field of Search .......... 425/214, 233, 246, 394, 425/395, 451; 100/270, 271

[56] References Cited
UNITED STATES PATENTS

| | | | |
|---|---|---|---|
| 1,443,476 | 1/1923 | Klocke | 100/271 |
| 3,317,999 | 5/1967 | Royer et al. | 425/84 |
| 3,348,267 | 10/1967 | Nouel | 425/233 |

Primary Examiner—Francis S. Husar
Assistant Examiner—Marc R. Davidson

[57] ABSTRACT

A bakery machine adapted to shape dough pieces into thin pies suitable for pizzas. The machine includes upper and lower platens for supporting an upper pie-shaping die and a lower dough pan, and a crank mechanism for reciprocating both platens concurrently to cause the platens to move toward and away from each other, thereby effecting alternate engagement and disengagement of the die and pan. The crank mechanism includes crank rods terminating in pistons operating within hydraulic cylinders attached to the platens and moving therewith. Those compartments of the cylinders which are subjected to pressure when the platens move toward each other are filled with oil and are coupled by flexible lines to a compressible pressure chamber normally maintaining the oil in the compartments at a predetermined pressure level, such that when engagement takes place the pressurized oil is forced out of the compartments into the pressure chamber, and when disengagement takes place, the oil returns from the chamber to the compartments.

5 Claims, 3 Drawing Figures

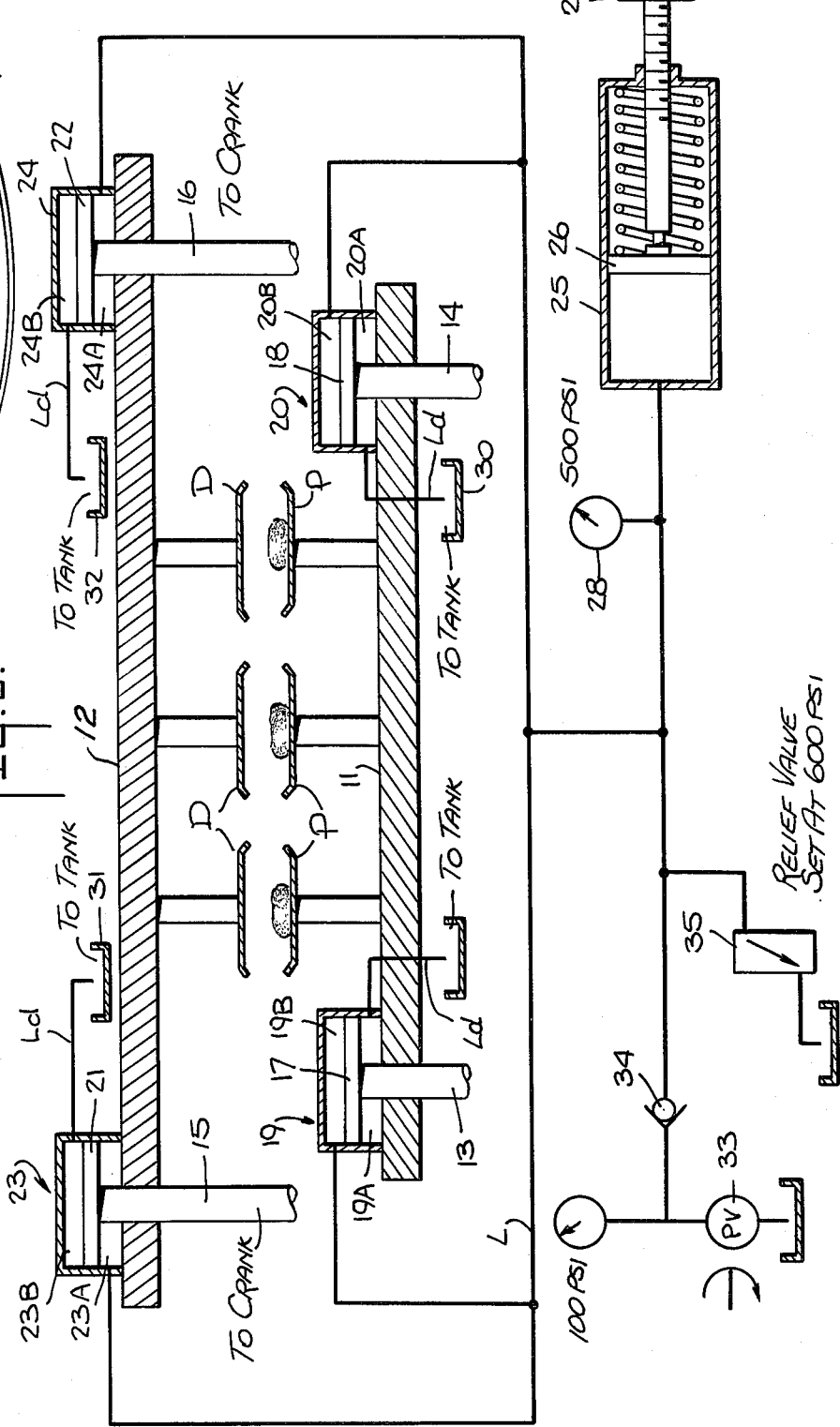

PIZZA PIE FORMING MACHINE

BACKGROUND OF THE INVENTION

This invention relates generally to bakery dough-shaping machines, and more particularly to a high-speed machine adapted to shape pieces of dough into the form of uniformly thin pies suitable for pizzas.

A pizza is an open pie made of thinly rolled bread dough spread with a spiced mixture, such as tomato sauce, cheese and ground meat, the pie thereafter being baked. The traditional pizza is made manually by working a piece of dough to cause it to assume the form of a thin, flat pie, the pie being then covered with suitable ingredients before being placed in the oven.

With the growing popularity of pizzas and the enormous demand therefor, the making of pies has become a mechanized bakery operation. Existing pizza-pie-making machines include hydraulically operated reciprocating platens supporting dies adapted to engage pieces of dough on stationary pans and serving to press the pieces into pie shape. In order to subject the dough to forming pressure to create a pie of the proper thinness, it is the present practice to spring-load the dies. The amount of pressure imposed on the die is determined by the springs, the hydraulic system serving only to bring the dies into engagement with the dough pieces.

The disadvantage of a spring-loaded die is that, as a practical matter, it is very difficult to produce spring pressures which are uniform through the operating area. The lack of uniformity generally encountered in existing machines, results in pizza pies which are improperly formed, some regions of the pie being excessively thin and others too thick.

SUMMARY OF THE INVENTION

In view of the foregoing, it is the main object of this invention to provide a pizza-pie-making machine in which a dough piece placed in a pan is subjected to forming pressure by a reciprocating die, the pressure imposed on the die being substantially uniform throughout the die area whereby the resultant pies are uniformly thin.

More particularly, it is an object of the invention to provide a machine of the above-type in which the die and dough pan are supported on reciprocating platens which are mechanically operated and which are subjected to fluidic pressure only when the platens occupy positions bringing the die into engagement with the dough piece.

Thus, in the present invention, the reciprocating action of the platens is not effected by a hydraulic system, as in the prior art, but by a simple and reliable crank mechanism which does not require operating oil pumps and which is fast acting, whereas the pressure imposed on the die and pan is fluidic.

A significant advantage of the invention is that the hydraulic pressures on the die and pan which are imposed on the ends of the supporting platens, are predetermined and are the same at all points, so that pressure imbalances are avoided and pies are produced having the proper shape.

An important feature of the invention is that the hydraulic pressure system is closed and operates without pumps except on those infrequent occasions when it is necessary to replenish oil in the system.

Briefly stated, these objects are accomplished in a pizza-pie-forming machine comprising upper and lower platens for supporting a pie-shaping die and a dough pan, respectively. Mechanical crank means are provided to reciprocate both platens concurrently to cause the platens to alternately bring about engagement of the die and pan and to effect disengagement thereof. Reciprocation of the platens is effected by crank rods coupled to a crank shaft, the rods terminating in pistons operating within hydraulic cylinders attached to the platens and moving therewith.

In operation, those compartments of the cylinders which are subjected to pressure when the platens approach each other, are filled with oil and are coupled by flexible lines to a compressible pressure chamber normally maintaining the oil in the compartments at a predetermined level such that when engagement takes place, the pressurized oil is forced out of the compartments into the chamber, and when disengagement takes place, the oil returns from the chamber to the compartments.

OUTLINE OF THE DRAWING

For a better understanding of the invention, as well as other objects and further features thereof, reference is made to the following detailed description to be read in conjunction with the accompanying drawing, wherein:

FIG. 1 illustrates in perspective a piece of dough on a pan, prior to forming by the machine;

FIG. 2 illustrates in perspective, the dough on the same pan after forming into a pie; and FIG. 3 schematically shows a machine in accordance with the invention.

DESCRIPTION OF THE INVENTION

Referring now to the drawings and more particularly to FIG. 1, there is shown a lump of bread dough 10 placed on a circular pan P having an annular rim, the dough shape being unformed. It will be seen that the dough piece is relatively thick, but of small diameter, so that it occupies only the center of pan P. The purpose of the machine, in accordance with the invention, is to press and shape the dough so that it assumes the form of a thin pie 10A of uniform thickness, as shown in FIG. 2, which occupies the full area of the pan.

This operation is carried out in the machine shown in FIG. 3, where a set of pans P is supported above a lower platen 11 which cooperates with an upper platen 12. Supported below upper platen 12 is a set of dies D which are adapted to engage the dough pieces 10 in the pans and to press them into the desired form. The illustration of the pans and dies is purely schematic. In practice, the several pans may be formed on a common plate which is received within a suitable socket on the lower platen and is removable therefrom after forming.

Platens 11 and 12 are caused to reciprocate simultaneously by means of a crank mechanism including a pair of crank rods 13 and 14 which raise and lower the lower platen, and a second pair of crank rods 15 and 16 which lower and raise the upper platen. Crank rods 13, 14, 15 and 16 are coupled in the usual manner to a motor-driven crank shaft (not shown), and serve to cause platens 11 and 12 to alternately approach each other and to retract. In the course of an operating cycle, dies D engage the dough pies 10 and press them into shape in pans P, the dies and pans then withdrawing from each other to permit new dough pieces to be put in place.

Rods 13 and 14 terminate in pistons 17 and 18 slidable within hydraulic cylinders 19 and 20, respectively, which are fixedly attached to opposite ends of platen 11. The rods freely pass through bores in the platen so that the associated pistons are movable within their cylinders, which cylinders travel with the platen. In a similar manner, rods 15 and 16 terminate in pistons 21 and 22 movable with hydraulic cylinders 23 and 24 attached to opposite ends of platen 12. Thus the crank rods are not directly connected to the platens but are coupled thereto through the hydraulic cylinders.

Each hydraulic cylinder is divided by its operating piston into front and rear compartments 19A and 19B, 20A and 20B, 23A and 23B, and 24A and 24B. The front compartments are the compartments which are disposed between the piston and the associated platen, whereas the rear compartments lie between the piston and the end of the cylinder. When the rods move the platens toward each other, the associated pistons subject the rear compartments 19B and 20B of cylinders 19 and 20 to pressure, while subjecting the front compartments 23A and 24A of cylinders 23 and 24 to pressure. These compartments are all filled with oil in a manner to be later described.

When the rods move the platens away from each other, the associated pistons subject the front compartments 19A and 20A of cylinders 19 and 20 to pressure, while subjecting the rear compartments 23B and 24B of cylinders 23 and 24 to pressure. These compartments communicate with the atmosphere and are filled with ambient air so that the air therein is forced out of the compartments when the rods push the platens away from each other.

The oil-filled compartments 19B, 20B, 23A and 24A are all coupled by flexible lines L to an external pressure chamber 25 having a piston 26 therein which is spring-loaded and tends to force the oil out of the chamber into the compartments. The amount of spring pressure is adjustable by means of a knob 27. In practice, this range of pressure control may be from 200 to 500 psi. A pressure indicator 28 is coupled to the line leading to chamber 25 so that the operator is able to adjust pressure to a desired level. Alternately, instead of spring pressure, the pressure chamber compartment behind the piston 26 may be filled with an inert gas, such as nitrogen, which is pressurized to a level providing the desired pressure tending to force the oil out of the chamber, the gas being compressible.

The hydraulic system is closed so that when the two platens are mechanically caused to approach each other and dies D are brought into engagement with the dough pieces on the pans P, crank rods 13, 14, 15 and 16 continue to move platens 11 and 12 and when movement of the platens is resisted by the moldable dough pieces, the pistons at the ends of the rods then proceed to force the oil from the oil compartments into the pressure chamber 25, where the incoming oil acts against the pressure imposed by piston 26.

Thus in a practical embodiment of the machine, the crank rods are so arranged that with each stroke thereof they travel six inches. The platens moved by the rods cause the dies and pans to engage when the rods have moved 5 inches, at which point the rods which still have an inch to go then act through the hydraulic cylinders to subject the oil in the compartments to pressure. There is no danger, therefore, of rod breakage, for when the die and pans are in engagement, movement of the rods is not arrested, but is merely resisted by the oil in the compartments.

The air-filled compartments of the cylinders may in time accumulate some oil by reason of leakage through the piston rings. Hence the system includes lines Ld to drain these compartments into tanks 29, 30, 31 and 32 associated with cylinders 19, 20, 23 and 24, respectively.

Because some oil is gradually lost, it is necessary occasionally to replenish the oil in the closed hydraulic system. To this end, a pump 33 is provided to feed oil into chamber 25 through a check valve 34 when replenishment is necessary. Should the pressure in the hydraulic line go above a safe value, say above 600 psi, this pressure is relieved by way of a relief valve 35.

Thus the system acts to equalize the pressure in the various hydraulic compartments, it is relatively foolproof, and is capable of uninterrupted high-speed operation to produce pizza pies of the desired shape and thinness.

While there has been shown and described a preferred embodiment of a pizza-pie-forming machine in accordance with the invention, it will be appreciated that many changes and modifications may be made therein without, however, departing from the essential spirit of the invention. Thus instead of using a set of hydraulic cylinders for both the upper and lower platens, one may have only one set of cylinders either on the lower or upper platens, in which event the crank rods are directly connected to the platen lacking cylinders. And instead of using oil-operated cylinders, the cylinders may be of the fluidic or air type, in which event the air is compressed to provide the desired pressure.

I claim:

1. A machine for shaping dough pieces into pies suitable for pizzas, said machine comprising:
   A. upper and lower platens in spaced, parallel relation for supporting a pie-shaping die and a dough-piece pan, respectively,
   B. a crank mechanism for reciprocating both platens concurrently to effect engagement between the die and pan and to effect disengagement therebetween, said crank mechanism including crank rods which stroke up and down and are coupled to the platens to effect the reciprocating motion thereof; and
   C. a hydraulic system for subjecting said dough piece to uniform fluidic pressure in the course of engagement, said system including cylinders mounted on at least one of said platens and movable therewith, each cylinder having a piston slidable therein, which piston is connected to a respective crank rod and acts to divide the associated cylinder into a front-side and a rear-side compartment whereby the cylinders are provided with a set of front-side compartments and a set of rear-side compartments, a compressible pressure chamber, means coupling the set of front-side compartments of the cylinders which compartments are subjected to pressure when the platens approach each other to said compressible pressure chamber, said set of front-side compartments being filled with oil whereby in the course of engagement, oil from the set of front-side compartments is forced into the chamber and is returned to the set of front-side compartments in the course of disengagement, and means connecting the set of rear-side compartments to the atmosphere whereby the set of rear-side compartments is filled with air.

2. A machine as set forth in claim 1 wherein said platens are both moved the same distance with each stroke of the crank rods.

3. A machine as set forth in claim 1, wherein said air-filled compartments are coupled by flexible pipes to a drainage to dispose of oil leaking therein.

4. A machine as set forth in claim 3, wherein said compressible pressure chamber includes a spring-loaded piston, and means to adjust spring pressure to determine the oil pressure in the cylinder compartments.

5. A machine as set forth in claim 3, further including pump means coupled to said chamber through a check valve to replenish oil therein.

* * * * *